F. REID.
Vacuum Pan.
No. 50,081.
Patented Sept. 19, 1865.
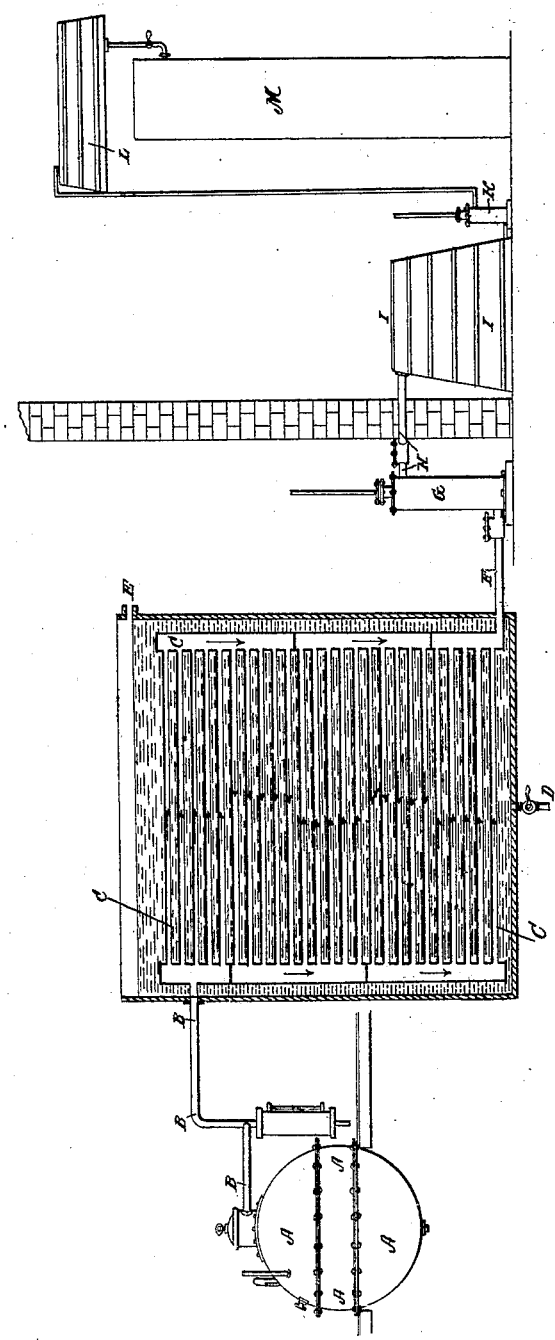
Witnesses
H. Walker
George Walker
Inventor:
Francis Reid.

UNITED STATES PATENT OFFICE.

FRANCIS REID, OF LIVERPOOL, ENGLAND.

IMPROVED PROCESS OF COLLECTING SPIRIT DURING THE REFINING OF SUGAR.

Specification forming part of Letters Patent No. 50,081, dated September 19, 1865; antedated June 21, 1865.

*To all whom it may concern:*

Be it known that I, FRANCIS REID, of Liverpool, in the county of Lancaster, in that part of the United Kingdom of Great Britain and Ireland called England, produce-broker, have invented or discovered a new and improved means for collecting and saving the spirit or alcohol generated by spontaneous fermentation in raw sugar, concrete, melada, and molasses, and thrown off during the process of boiling or refining, which spirit or alcohol has hitherto been entirely lost; and I do hereby declare that the following is a full and exact description thereof, and to which description, for the purpose of more readily understanding the means by which the said invention may be carried into practical effect, I have hereunto annexed outline-drawings of an apparatus which I consider suitable for carrying out the desired end, and have referred to the said drawings in this description by means of letters and figures marked thereon, although I make no claim to any peculiar apparatus for accomplishing the desired end, as the same may be done by various other arrangements of apparatus, to be as follows—that is to say:

Raw sugar, concrete, melada, and molasses are all liable (more or less) to spontaneous fermentation, and this is especially observable in the last named article, which, when landed from the ship by which it has been conveyed from the country where it was produced, is usually found to be brisk and frothy, proving a partial destruction of saccharine matter and the generation of spirit or alcohol. The whole of the spirit thus formed has hitherto been entirely lost during the process of refining or boiling, no means having been adopted to save it. The object of this my said invention is a plan to effect this desideratum.

My plan is simply to attach a condensing apparatus of any description to any kind of covered pan in which the above articles may be boiled, whether the same be done *in vacuo* or otherwise, the vapor from which, being thereby condensed, will be found to be a weak mixture of spirit and water, valuable for rectifying, distilling, or other purposes.

This my said invention may be carried into effect by connecting the ordinary vacuum-pans with a common worm-condenser, and collecting the products condensed and using them for the purposes hereinbefore described; but the apparatus I should prefer to use would be such a one as is illustrated in the annexed drawing.

A is a vacuum-pan of the ordinary description, fitted in the ordinary way, and which is connected by B (pipes) to C, the condenser, which consists of a number of horizontal parallel pipes opening into a chamber at each end, and which are so subdivided as to cause the vapor to pass in a zigzag direction through the several pipes and chambers into which they open, as indicated by the arrows. This condenser is immersed in a cistern of cold water, and is supplied from the bottom through the cock D, the supply-pipe of which is shown broken off.

The waste-water escapes through E, a waste-pipe on the top of the cistern containing the condenser; F, a pipe connecting the interior of the condenser with G, an air-pump, the rod of which is shown broken off; H, the discharge-pipe of the air-pump, through which the products of condensation are conveyed to I, the condense-liquid vat or receiver, which is connected with K, a force-pump, the rod of which is also seen broken off, and which is used to elevate the liquid into L, a receiver, situated immediately above M, a Coffey's still.

The action of the apparatus is as follows: On the vacuum-pan containing the raw sugar, concrete, melada, or molasses, being heated, the air-pump is set to work, and the vapor arising therefrom is drawn through the several pipes of the condenser, where it is condensed and drawn off by the air-pump and discharged into the condense liquid vat or receiver, from whence it is pumped into the receiver at the head of the still, ready to be distilled or rectified for the purpose of extracting the spirit or alcohol therefrom.

I wish it to be understood that I do not rest my claim on any peculiar mode of boiling or refining raw sugars, concrete, melada, or molasses, or in condensing the vapors therefrom; but

What I claim is—

Solely the collecting and saving of such spirit or alcohol as may be generated and thrown off during the process of boiling or refining raw sugars, concrete, melada, and molasses, substantially in the manner and for the purposes hereinbefore described and set forth.

In witness whereof I, the said FRANCIS REID, have hereunto set my hand this 1st day February, in the year of our Lord 1864.

FRANCIS REID.

Witnesses:
WILLIAM WALKER,
　Of 44 Castle Street, Liverpool.
GEORGE WALKER,
　Secretary, 44 Castle Street, Liverpool.